United States Patent
Gallagher et al.

(10) Patent No.: US 10,363,805 B2
(45) Date of Patent: Jul. 30, 2019

(54) HANDLING STRUT

(71) Applicant: BENTLEY MOTORS LIMITED, Crewe (GB)

(72) Inventors: Thomas Gallagher, Willaston (GB); Jonathan Layfield, Nantwich (GB); Paul Kennings, Nantwich (GB); Paul Furnival, Market Drayton (GB); Martin Robert Peel, Nantwich (GB)

(73) Assignee: BENTLEY MOTORS LIMITED, Crewe, Cheshire (GB)

( * ) Notice: Subject to any disclaimer, the term of this patent is extended or adjusted under 35 U.S.C. 154(b) by 0 days.

(21) Appl. No.: 15/759,068

(22) PCT Filed: Sep. 7, 2016

(86) PCT No.: PCT/GB2016/052748
§ 371 (c)(1),
(2) Date: Mar. 9, 2018

(87) PCT Pub. No.: WO2017/042552
PCT Pub. Date: Mar. 16, 2017

(65) Prior Publication Data
US 2019/0047396 A1    Feb. 14, 2019

(30) Foreign Application Priority Data

Sep. 10, 2015 (GB) .................................. 1516078.1

(51) Int. Cl.
*B60K 5/12* (2006.01)
*F16F 1/38* (2006.01)
(Continued)

(52) U.S. Cl.
CPC .......... *B60K 5/1241* (2013.01); *B60K 5/1208* (2013.01); *F16F 1/38* (2013.01);
(Continued)

(58) Field of Classification Search
CPC ... B25B 27/00; B25B 27/0035; B60K 5/1241; B60K 5/1208; B60K 5/1283;
(Continued)

(56) References Cited

U.S. PATENT DOCUMENTS 4,518,058 A    5/1985  Fister et al.
4,706,946 A *  11/1987 Thorn .................. B60K 5/1241
                                                      248/636
(Continued)

FOREIGN PATENT DOCUMENTS

CN    103895489 A      7/2014
DE    4118266 A1 * 12/1991 ......... B60K 17/3467
(Continued)

*Primary Examiner* — James A Shriver, II
*Assistant Examiner* — Steve Clemmons
(74) *Attorney, Agent, or Firm* — Schwabe Williamson & Wyatt, P.C.

(57) ABSTRACT

A handling strut connects the powertrain of an automobile to a structural member, such as a panel in the engine bay. The handling strut is comprised of two strut members, one connected to the powertrain, the other connected to the structural member. A shaft attached to one strut member, extends through a bushing provided in the other strut member and an air gap is provided between the bushing and the shaft, such that when the engine is idle, or not accelerating, and in the absence of hard cornering, the strut members are decoupled. The isolation of the strut members when not required to control engine roll, reduces/avoids transmission of noise, vibration and/or harshness.

16 Claims, 11 Drawing Sheets

(52) U.S. Cl.
CPC ........ *F16F 1/3807* (2013.01); *F16F 2228/10* (2013.01); *F16F 2230/16* (2013.01)

(58) Field of Classification Search
CPC ... B60K 5/1216; B60K 5/1225; F16F 1/3807; F16F 1/3842; F16F 1/3863; F16F 7/08; F16F 2228/10; F16F 2230/16; F16F 1/38; F16F 1/3732; F16F 15/20
See application file for complete search history.

(56) References Cited

U.S. PATENT DOCUMENTS

| | | | | |
|---|---|---|---|---|
| 4,953,278 | A * | 9/1990 | Specktor | B25B 27/0035 29/402.06 |
| 5,133,427 | A * | 7/1992 | Arvidsson | B60K 5/1216 180/297 |
| 8,342,285 | B2 * | 1/2013 | Lee | F16F 13/10 180/312 |
| 9,175,739 | B2 * | 11/2015 | Ohnishi | F16F 1/36 |
| 9,682,613 | B2 * | 6/2017 | Miya | B60K 5/1216 |
| 9,821,655 | B2 * | 11/2017 | Ogawa | B60K 23/08 |
| 2005/0254888 | A1 * | 11/2005 | Oji | F16F 1/3849 403/187 |
| 2013/0112840 | A1 | 5/2013 | Glover | |
| 2014/0367547 | A1 | 12/2014 | Ohnishi et al. | |

FOREIGN PATENT DOCUMENTS

| | | | |
|---|---|---|---|
| DE | 10018058 A1 * | 10/2001 | ......... B25B 27/0035 |
| DE | 102013213078 A1 | 1/2015 | |
| JP | 2014173682 A | 9/2014 | |
| KR | 200368305 | 11/2004 | |
| WO | WO2014103194 A1 | 7/2014 | |

* cited by examiner

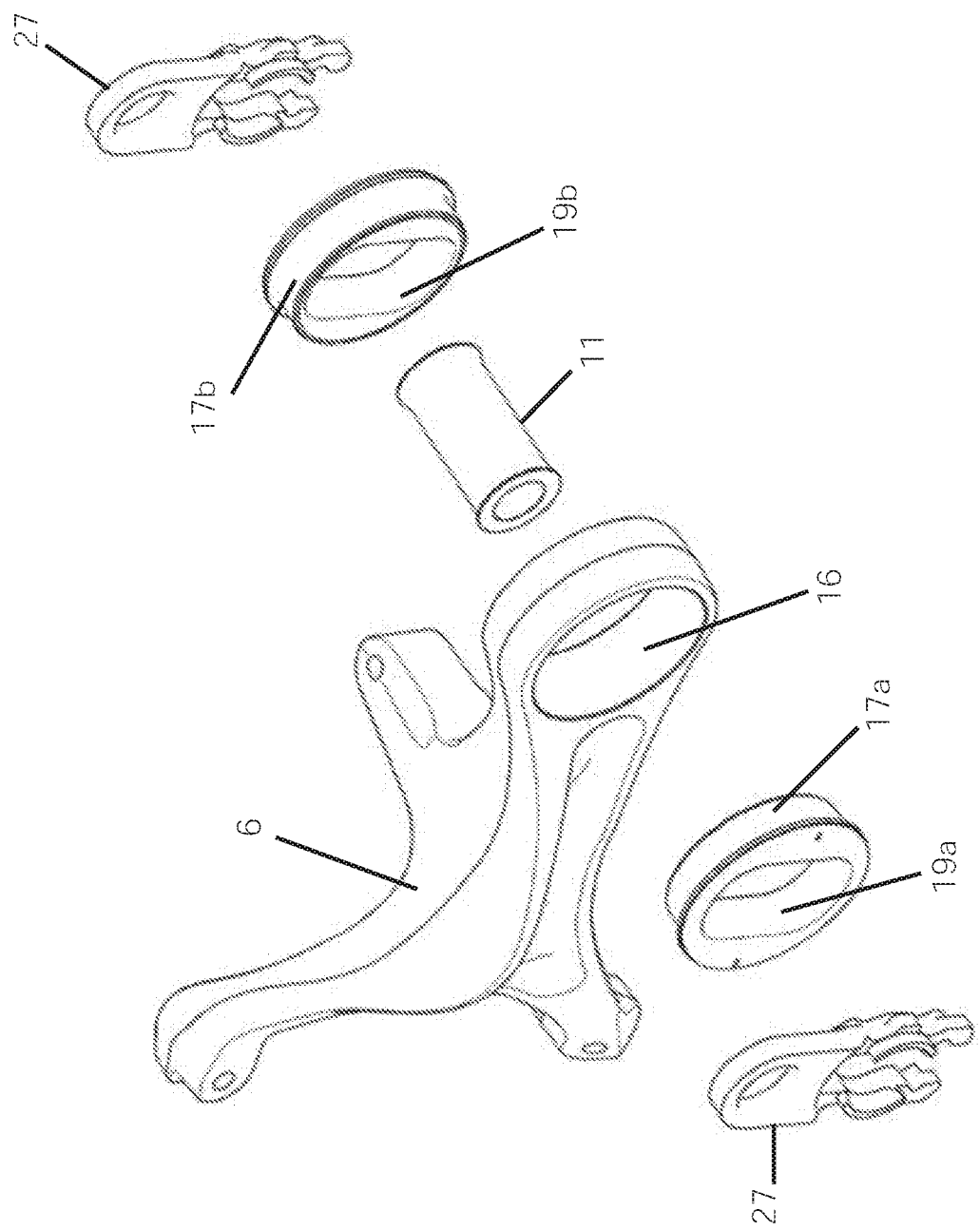

HANDLING STRUT

CROSS REFERENCE TO RELATED APPLICATIONS

The present application is a national phase entry under 35 U.S.C. § 371 of International Application No. PCT/GB2016/052748, filed Sep. 7, 2016, entitled "HANDLING STRUT," which designated, among the various States, the United States of America, and which claims priority to GB 1516078.1 filed Sep. 10, 2015, both of which are hereby incorporated by reference.

TECHNICAL FIELD OF THE INVENTION

The present invention relates to a handling strut and in particular a handling strut for reduction of engine roll.

BACKGROUND TO THE INVENTION

Handling struts for reducing engine roll under conditions of high lateral load are known. They act against movement of the powertrain independent of the body of the vehicle. Especially in vehicles with large engines, such as the W12 engine used by Bentley Motors, movement of the engine independent of the body of the vehicle can lead to poor handling characteristics. This movement is caused primarily by one of two factors: the engine itself, when accelerating may rotate about a torque axis, the other factor is momentum of the engine, which, especially in hard cornering, opposes the direction of the body of the automobile.

Handling struts to restrain the powertrain of automobiles have been proposed in inter alia US2013/0112840, U.S. Pat. Nos. 4,518,058 and 4,706,946, all of which note at least one of the problems of struts transmitting noise, vibrations and/or harshness to the passenger compartment and seek to avoid one or more of these undesirable characteristics. Each proposes a strut, having a damper; a hydraulic arrangement in U.S. Pat. No. 4,518,058, an elastic bushing in US2013/0112840, and elastomeric block in U.S. Pat. No. 4,706,946.

However, as automobiles have become quieter generally and with the use of stiffer materials for panels, noise and vibration can still be noticeable despite the damping mechanisms of the prior art. In particular, handling struts are often attached to large panels which can act as a drum-skin, amplifying noise, and transmitting vibrations to the cockpit. This invention seeks to provide an improved handling strut.

SUMMARY OF THE INVENTION

According to a first aspect of the present invention there is provided a handling strut for a vehicle, the handling strut formed of at least two strut members; a first strut member for connection to a powertrain and a second strut member for connection to a structural member of the vehicle; wherein one of said strut members comprises a bushing and the other strut member comprises a shaft arranged to extend through an aperture in the bushing; characterised by the aperture through the bushing being wider than the shaft, and a predetermined air gap being provided between the shaft and the bushing.

Provision of an aperture that is wider than the shaft, whereby an air gap is provided between the shaft and the bushing, means that the handling strut can be mounted in the vehicle such that in the absence of engine roll, the engine is isolated from the structural member to which the second strut member is connected. Thus, when the engine is idle, or running gently in the absence of high lateral cornering loads, noise, vibration and harshness is not transmitted from the engine to the structural member of the vehicle through the handling strut, as the two strut members are decoupled. This can decrease the noise transmitted to the cockpit.

The size and shape of the air gap can be tuned to determine the amount of lateral movement required before the shaft abuts the bushing and the strut becomes effective, providing a reaction force against the lateral roll.

The shape of the aperture in the bushing may be elongate, e.g. substantially rectangular or ovular. In particular with a substantially rectangular aperture, the bushing can be arranged such that the elongate axis is substantially vertical. The powertrain may be mounted on low stiffness engine mounts, on which the height of the powertrain may vary (settling over time), or on active engine mounts, with adaptable stiffness and damping, which can change the height of the engine. Accordingly, with a rectangular aperture, with the axis in the vertical direction, an air gap may remain between the shaft and the bushing and the lateral gap between the shaft and the bushing may remain substantially constant, even as the height of the engine changes.

When the engine rolls, the shaft will move laterally and close the lateral gap on one side or the other, impinging on the inside edge of the aperture of the bushing, thus it is the lateral gap that determines the amount of engine roll allowed before the handling strut becomes effective.

For example, in one particular embodiment, the lateral air gap may be about 7 mm in total, i.e. 3.5 mm (+/−1 mm) on each side of the shaft in the rest position, the lateral air gap may be between 5 and 10 mm, or even between 3 and 15 mm. The larger the lateral air gap, the more roll is allowed before the handling strut becomes effective. Accordingly, (all else being equal) a bigger gap will result in greater isolation from NVH, and a smaller gap will result in a more quickly effective handling strut.

For example, in one particular embodiment, the "vertical" air gap may be about 24 mm in total, i.e. 12 mm (+/−1 mm) above and below the shaft in the rest position. The axial air gap may be between 20 and 30 mm, or even between 10 and 50 mm, as required. A larger vertical air gap allows more scope for movement up and down of the engine, e.g. due to soft engine mounts, settling over time, or adjustment of active engine mounts.

Since the strut is intended to prevent lateral movement, but not vertical movement, the lateral air gap may be smaller than the vertical air gap. Of course, it will be understood that this same result could be obtained with a regular aperture if the shape of the shaft was modified, e.g. elongate in the lateral direction. Typically, though, the shaft may have a circular cross section.

The bushing may be resilient. The bushing may be formed of an elastomeric material. Forming the bushing from a resilient material, such as an elastomer, allows further tuning of the reaction force once the air gap is closed as the engine rolls. This effectively provides the advantages of the prior art in addition to the improved isolation from NVH under idle/gentle cornering conditions.

The shaft may comprise a sleeve. A fastener, such as a bolt, may extend through the sleeve to connect the shaft to the respective strut member.

The first strut member (for connection to the powertrain) may comprise the sleeve. The second strut member (for connection to a structural member of the automobile) may comprise the bushing.

The first strut member may comprise an engine bracket, having fixtures arranged for fixing to an engine. The fixtures may comprise feet provided with apertures corresponding to threaded apertures in the powertrain, to which the feet may be bolted.

The second strut member may comprise fixtures for connection to the structural member, the fixtures may comprise projections provided with apertures corresponding to threaded apertures in the structural member of the automobile, to which the projections may be bolted.

The first or second strut member may include a clevis arranged to receive the other strut member, including the bushing and arranged to be connected to the shaft.

The clevis may be provided with opposing perforations through which a bolt may extend, to hold a sleeve in place.

In a second aspect of the invention, there is provided a vehicle comprising a powertrain and structural members, the powertrain being connected to at least one structural member by mounts and connected to another structural member by a handling strut formed of at least two strut members; a first strut member connected to the powertrain and a second strut member connected to the structural member of the vehicle; wherein one of said strut members comprises a bushing and the other strut member comprises a shaft arranged to extend through an aperture in the bushing; characterised by the aperture through the bushing being wider than the shaft, and a predetermined air gap being provided between the shaft and the bushing.

The vehicle may be an automobile.

The vehicle may be a luxury automobile or a performance automobile and may be a luxury performance automobile. Luxury performance automobiles tend to have large engines (e.g. 3 liters or more), high levels of quietness and comfort under normal driving conditions, but good handling at speed. The vehicle may be rear wheel drive, or four wheel drive. These are also typical characteristics of luxury performance vehicles.

The invention is particularly suited for luxury performance vehicles, because of the fact that under normal/gentle driving conditions, the isolation of the powertrain from the structural member to which the handling strut is connected leads to reduction of NVH (i.e. increased quietness/comfort), but under harder conditions, e.g. hard acceleration and/or hard cornering, the strut becomes effective, restraining the powertrain and hence improving performance.

The handling strut of the second aspect of the invention may comprise the optional features of the handling strut of the first aspect of the invention, as set out above.

In a third aspect of the invention, there is provided a shaft location tool for arranging a shaft in a predetermined position within an aperture in a bushing, so as to provide a predetermined air gap between the shaft and the inside edge of the aperture in the bushing; the shaft location tool comprising a shaft receiving portion and a aperture engagement portion; the aperture engagement portion shaped and sized to be inserted into the inside edge of the aperture in the bushing and the shaft receiving portion arranged to receive the shaft in a predetermined location; whereby, the shaft may be inserted into the shaft location tool in a predetermined location and the shaft location tool may be inserted into the aperture such that the aperture engagement portion abuts the inside edge of the aperture, such that a predetermined clearance is provided between the inside edge of the aperture in the bushing and the shaft.

The shaft location tool of the invention allows the shaft to be positioned in the predetermined position in the bushing before the strut members are attached to the powertrain and the structural member respectively. Thus, once the strut members are attached the shaft may be fixed in position relative to the strut member to which it is connected (e.g. by a bolt inserted through the sleeve to attach it to the clevis of a strut member), then, the shaft location tool may be removed, leaving the shaft centralised in the aperture, with a predetermined air gap in the rest position.

The shaft location tool may comprise at least one, or a pair of, assembly clips, each comprising an aperture engagement portion, arranged to engage with opposite sides of the aperture and each comprising a pair of shaft-receiving claws arranged to receive the shaft. The claws may be resilient and may comprise a pair of formations such as notches or opposed concave surfaces arranged to receive the shaft. In one arrangement an assembly clip may comprise two relatively movable components which may be moved relative to one another so as to locate a shaft relative to the clip. One component may define an open ended slot. One component may define a hook movable to open or close the slot. In all embodiments the shaft location tool may include a formation, such as a tab or ring, to facilitate handling by a user.

The shaft location tool may be arranged to locate the shaft of a handling strut according to the first aspect of the invention in the bushing of the handling strut of the first aspect of the invention, for attachment to an automobile according to the second aspect of the invention (including any of the optional features of either aspect).

A fourth aspect of the invention provides a method of installing a handling strut in an automobile, the method comprising connecting a first strut member to a powertrain and connecting a second strut member to a structural member of the vehicle; wherein one of said strut members comprises a bushing and the other strut member comprises a shaft arranged to extend through an aperture in the bushing; characterised by the aperture through the bushing being wider than the shaft, and a predetermined air gap being provided between the shaft and the bushing.

The method may comprise clipping the shaft into a shaft location tool and arranging the shaft location tool in the aperture of the bushing, so as to locate the shaft in a predetermined position; rigidly fixing the strut members to the powertrain and the structural member of the vehicle respectively and rigidly fixing the shaft in position, then removing the shaft location tool, so as to provide a predetermined air gap between the shaft and the bushing.

The handling strut may be the handling strut according to the first aspect of the invention, optionally including any optional features and/or the automobile may be the automobile of the second aspect of the invention, optionally including any optional features, and/or the shaft location tool may be the shaft location tool of the third aspect of the invention, optionally including any optional features.

DETAILED DESCRIPTION OF THE INVENTION

In order that the invention may be more clearly understood embodiments thereof will now be described, by way of example only, with reference to the accompanying drawings, of which:

FIG. 10 is a view corresponding to FIG. 5, but showing the shaft location tool of FIGS. 7 to 9;

Figure 1:
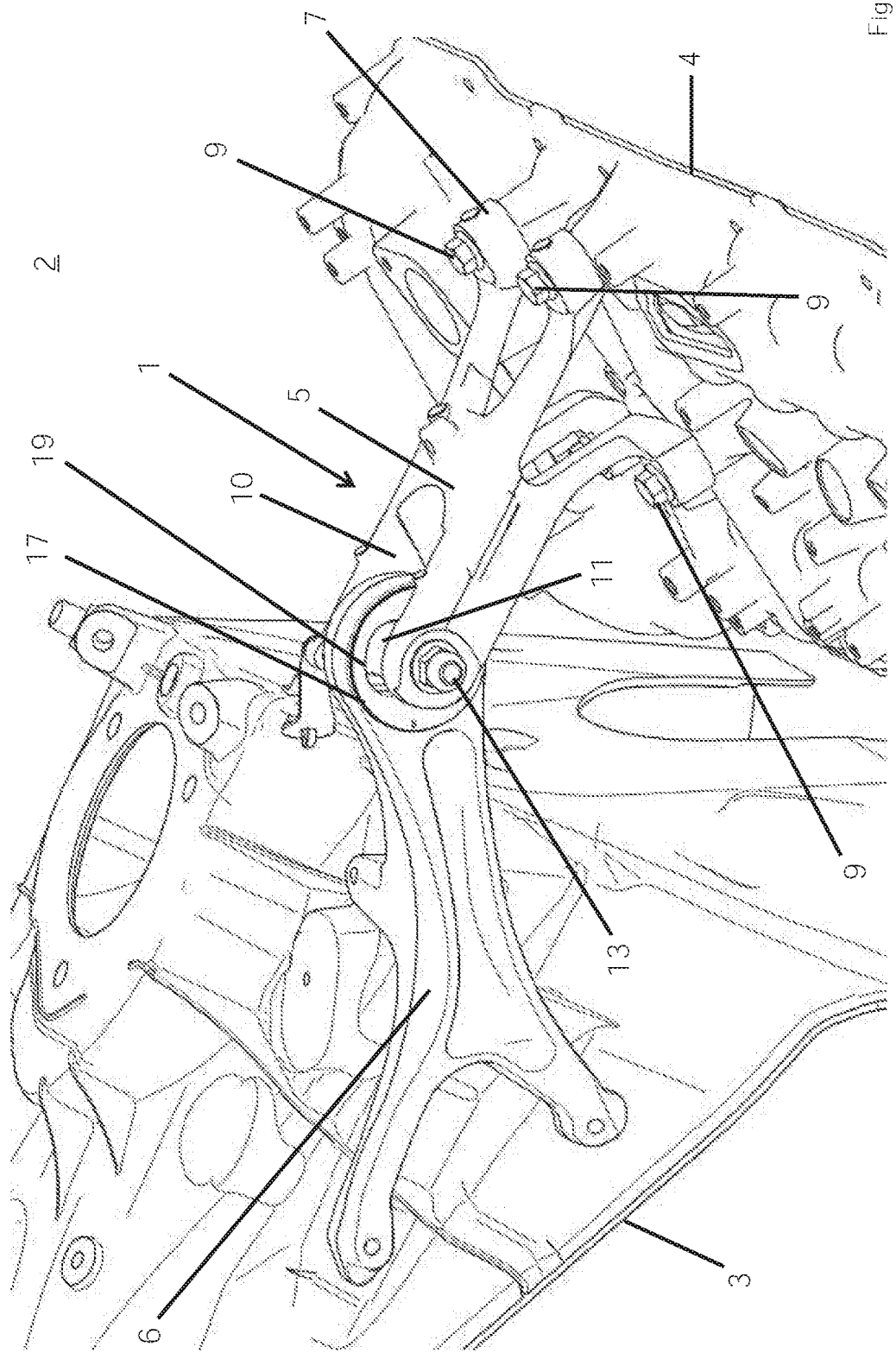
FIG. 1 is a perspective view of a handling strut according to the invention installed in an automobile.

With reference to FIG. 1, the handling strut 1 of the invention is installed in an automobile 2 between a structural member 3 of the automobile, in this case a panel of the engine bay and the powertrain 4, in this case the engine.

The handling strut 1 is formed of two main components, a first strut member 5, which, in use, is connected to the powertrain 4 and a second strut member 6, which is connected to the structural member 3 of the automobile.

Figure 2:
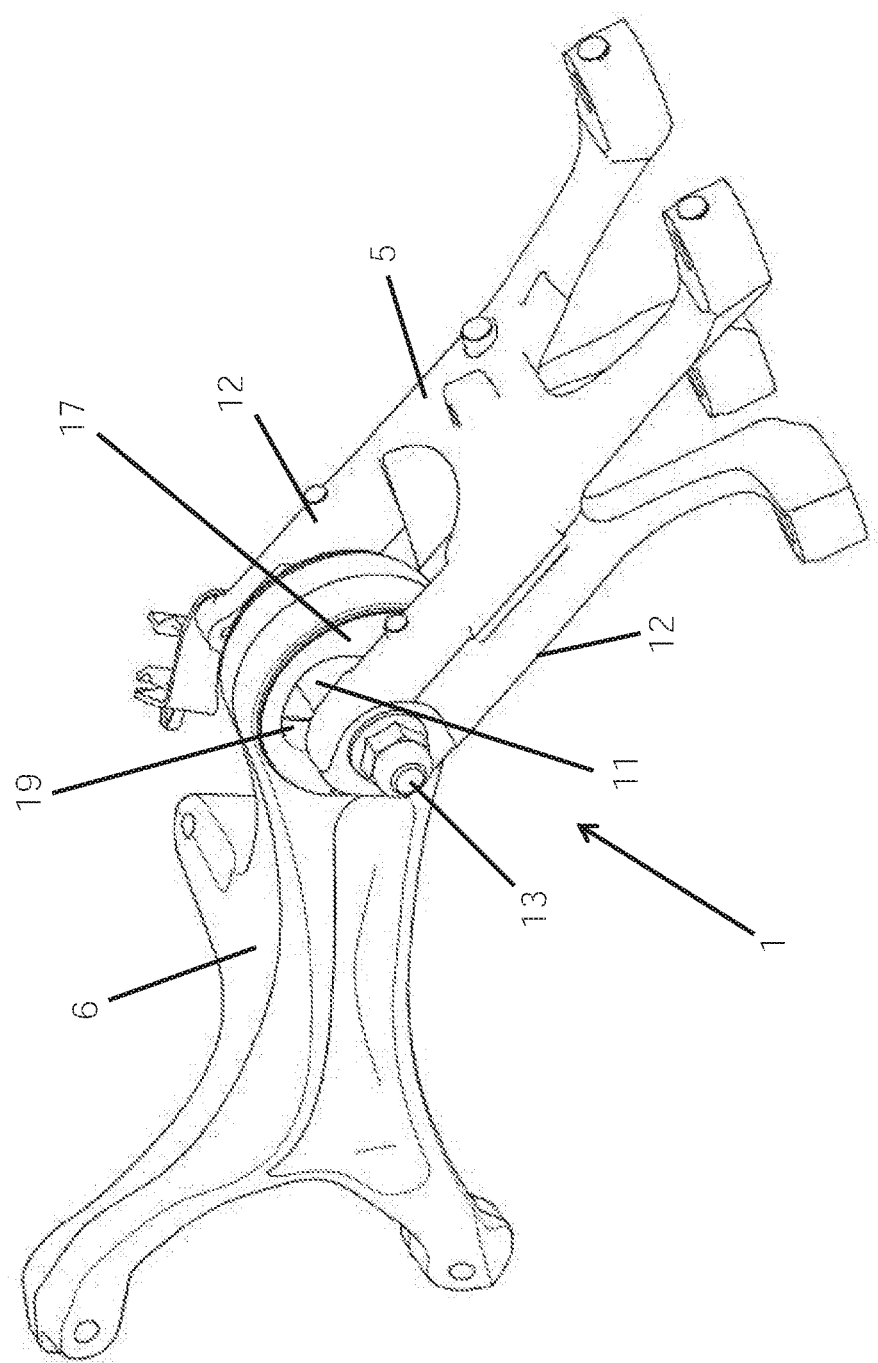
FIG. 2 is a perspective view of the handling strut of FIG. 1 in isolation from the automobile.
Figure 3:
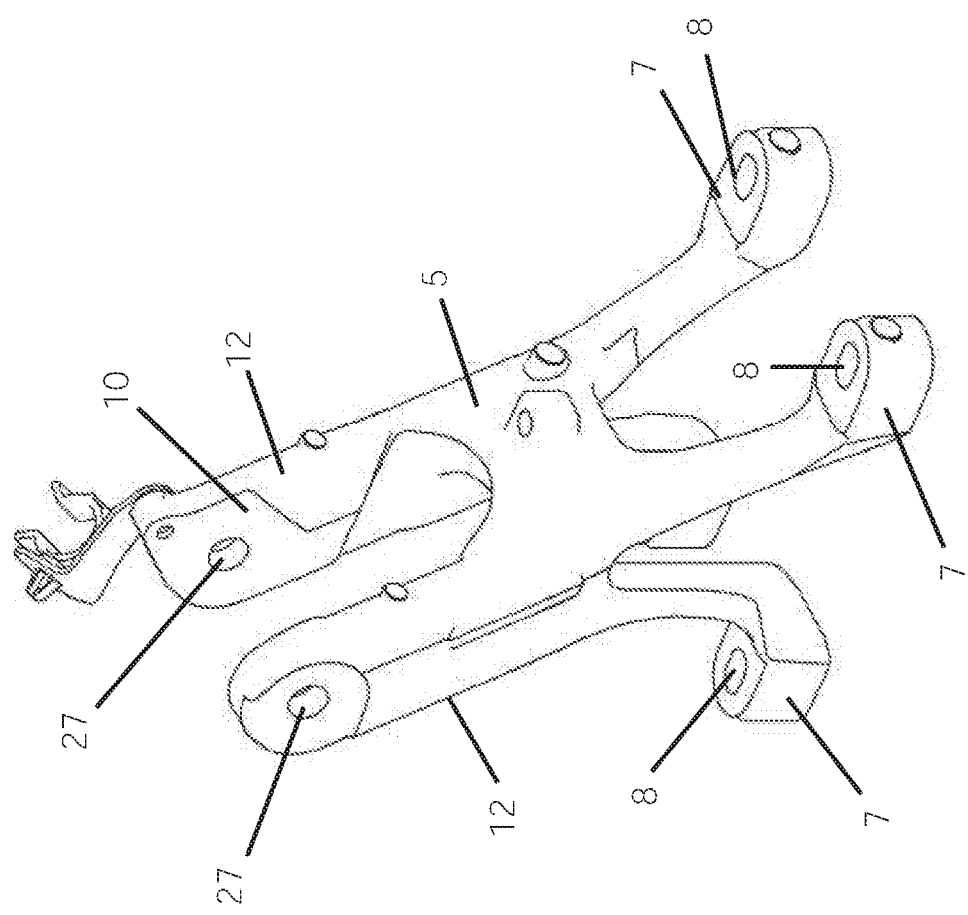
FIG. 3 is a perspective view of a first strut member of the handling strut of FIGS. 1 and 2 in isolation.

The first strut member 5 that is connected to the powertrain 4 and shown in isolation in FIG. 3, is, in the embodiment, formed from a strong and rigid material, e.g. cast from metal, such as aluminium/steel. The first strut member 5 includes fixtures 7 in the form of feet provided with apertures 8 for rigid attachment to the powertrain 4 by way of bolts 9. The first strut member 5 is generally elongate and at the opposite end to the feet fixtures 7, a clevis 10 is provided. As shown in FIGS. 1 and 2, a shaft in the form of a sleeve 11 extends between the prolongations 12, which form the clevis 10. The sleeve 11 is held in fixed position place between the prolongations 12 of the clevis 10, by a fastener in the form of a nut (not shown) and bolt 13.

The first strut member 5 is arranged such that the sleeve 11 extends in the longitudinal (fore and aft) direction of the automobile.

Figure 4:
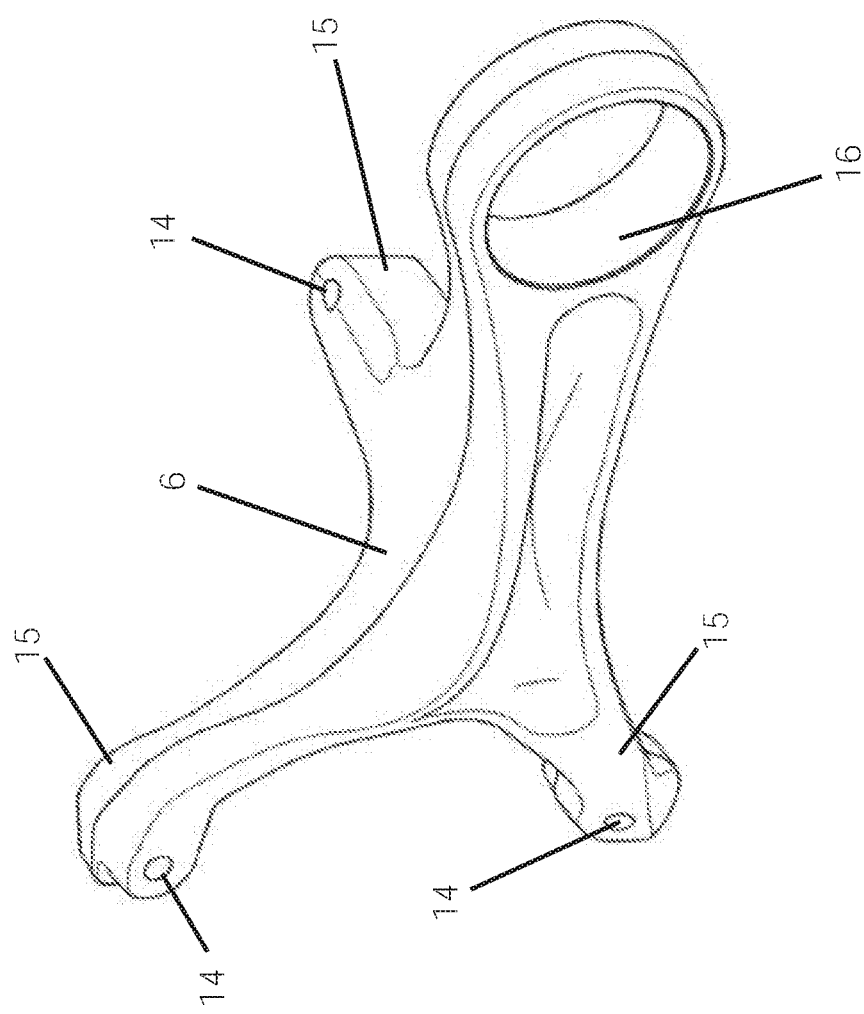
FIG. 4 is a perspective view of a second strut member of the handling strut of FIGS. 1 and 2 in isolation.

The second strut member 6, shown in isolation in FIG. 4, similarly to the first strut member 5, is provided with fixtures, in this case three apertures 14 in fingers 15, which are arranged to be rigidly attached to different parts of the structural member 3 of the automobile so as to provide a firm and stable connection to the structural member 3. Again, broadly speaking, the second strut member 6 is elongate and at the opposite end to the fingers 15, a mounting point in the form of a cylindrical opening 16 is provided. The axis of the cylindrical opening 16 is arranged to extend in the longitudinal (fore and aft) direction of the automobile.

The second strut member 6 is also formed of a strong and rigid material, e.g. cast from aluminium or steel. Mounted in the cylindrical opening, as shown in FIGS. 1 and 2, is a resilient, elastomeric bushing 17. The mounting point 16 of the second strut member 6 is slotted into the clevis 10, with the bushing 17 and the sleeve 11 having the same axis.

Figure 5:
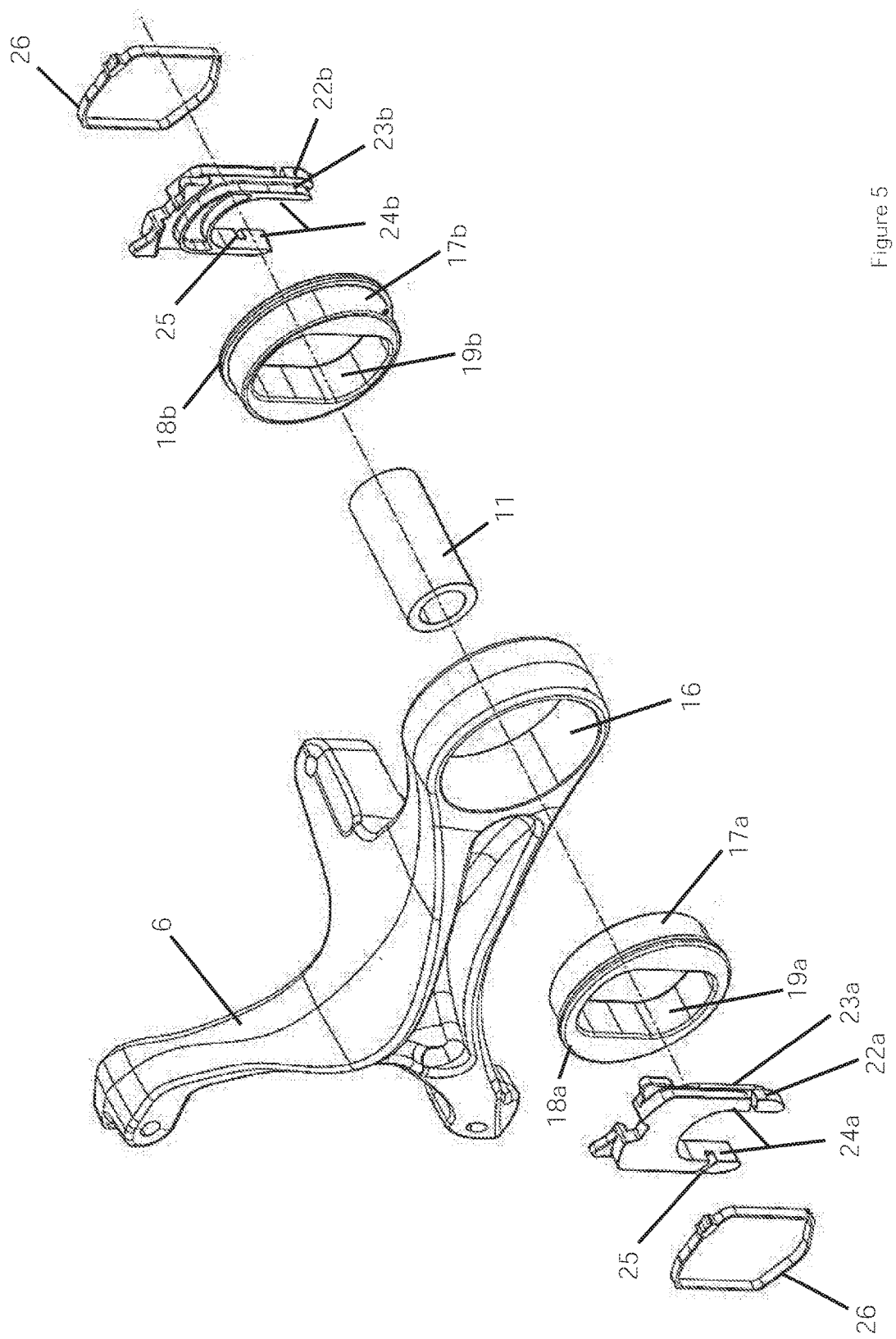
FIG. 5 is an exploded perspective view of an assembly for assembling the handling strut of FIGS. 1 and 2, including an embodiment of a shaft location tool.
Figure 6:
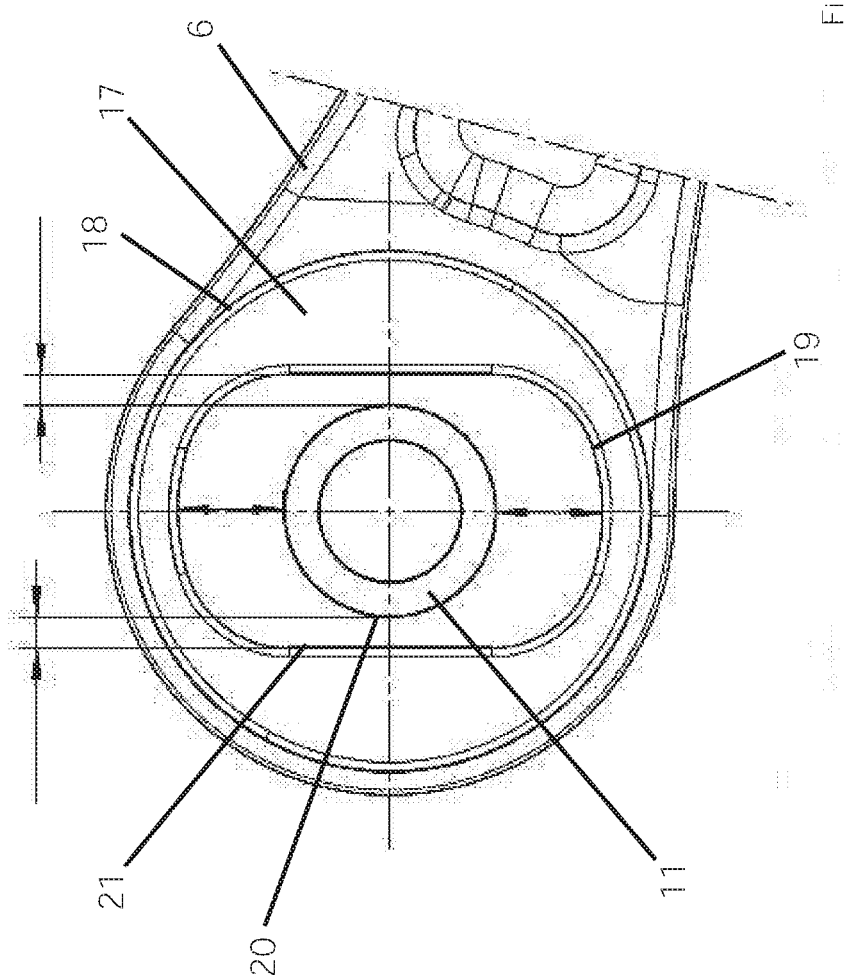
FIG. 6 is a partial end view of a portion of the second strut member with the shaft extending therethrough.

With reference to FIG. 5, the bushing 17 is provided as two halves, 17a 17b, these halves are pushed into the mounting point 16 from opposite sides and each have a flange 18a, 18b which locates in a circumferential recess in the mounting point 16. The bushing 17 (i.e. each half thereof) is provided with an elongate aperture 19 (19a, 19b) which is larger than the outer diameter of the sleeve 11. Thus, as shown in FIG. 6, at rest, the shaft/sleeve 11 sits coaxially with the aperture 19 but with its outside edge 20 spaced from the inside edge of the aperture 19. The aperture 19 is generally rectangular (with rounded corners), and is oriented with its long axis substantially vertically. Thus, at rest, the air gap between the sleeve 11 and the top and bottom surfaces of the aperture is larger than that between the lateral surfaces of the aperture. Suitably, at rest, a gap of 3.5 mm (+/−1 mm) may be provided between each lateral wall and the closest surface of the sleeve 11 and a gap of 12 mm (+/−1 mm) may be provided between each of the upper and lower surfaces of the aperture and the respective closest surface of the sleeve 11.

Figure 5B:
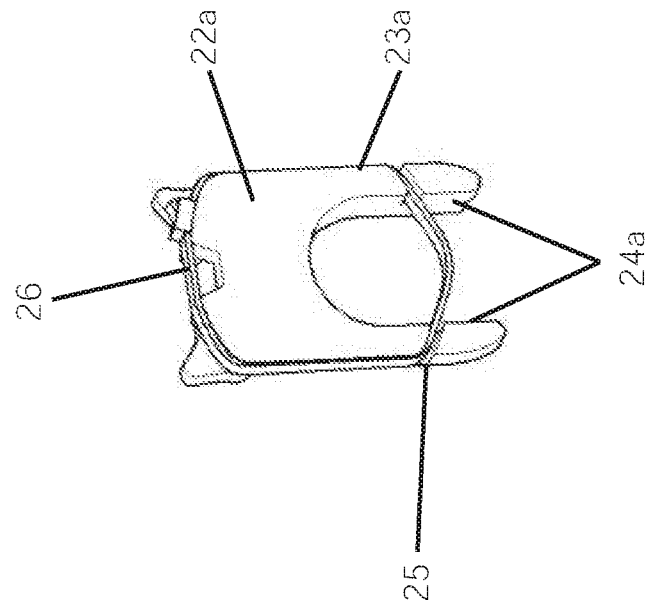
FIG. 5b is a perspective view of part of the shaft location tool of FIG. 5
Figure 5A:
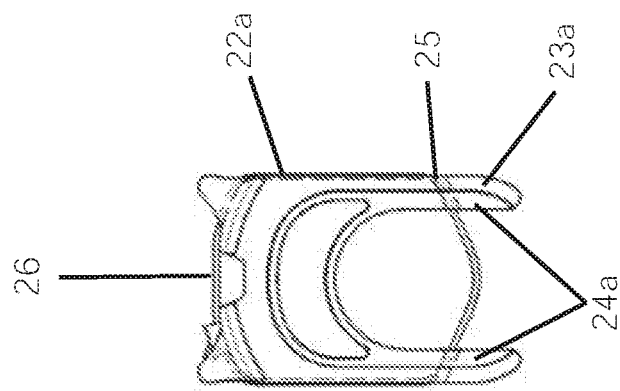
FIG. 5a is a rear elevation of part of the shaft location tool of FIG. 5.

In order to accurately position the shaft/sleeve 11 in the aperture 19, as shown in FIGS. 5, 5a and 5b, a shaft location tool 22 is provided. The shaft location tool 22 consists of a pair of assembly clips 22a, 22b, each formed with an aperture engagement portion 23a, 23b, which is a protrusion shaped to mate with the sides of the aperture 19, being as wide and long as the aperture 19, arranged to engage with opposite sides of the aperture. The assembly clips 22a, 22b are each also provided with a pair of shaft-receiving claws 24a, 24b arranged to receive and clip onto the shaft 11. The claws 24 are resilient and may include comprise a pair of notches (one on each claw) arranged to receive the shaft 11. Alternatively, or additionally, as shown in the embodiment of FIGS. 5, 5a and 5b, a band or strap (which may or may not be resiliently stretchable) such as a cable tie 26 may be provided to hold the sleeve 11 in the U-shaped region between the claws, and grooves 25 provided on each claw 24, into which the cable ties slot.

In order to install the handling strut of the invention, the powertrain 4 is first installed in the automobile on mounts (not shown). The bushing 17 is inserted into the mounting point 16 of the second structural member, the sleeve 11 is inserted through the aperture 19 in the bushing 17 and the shaft location tool 22 is inserted into the aperture 19 of the bushing 17, such that the aperture engagement portions 23 engage with the aperture to locate the shaft location tool 22 in a fixed position in the aperture. The shaft is then pushed into the U-shaped region between the claws 24 of the shaft location tool 22 and cable ties 26 (where employed) are attached to hold the shaft in position in the u-shaped region, whereby it is centralised with respect to the aperture 19 in the bushing 17.

The mounting point 16, is then slotted into the clevis 10 of the first strut member 5, and the bolt 13 introduced through holes 27 in the clevis, through the sleeve 11 and into a nut (not shown), which is tightened so as to fix the position of the sleeve 11 in the first strut member 5. The fixtures 14 in the second strut member and the fixtures 7 in the first strut member are then rigidly fastened in place to the structural member 3 and the powertrain 4 respectively.

Once all the fixtures are tight and a rigid connection is formed between the clevis 10 and the sleeve 11 and between the strut members and the structural member and the powertrain 4, with the powertrain 4 in the rest position, the cable ties 26 are undone and the shaft location tool 22 is removed, leaving the shaft 11 fixed relative to the aperture of the bushing 17, with a predetermined air gap between the shaft 11 and the inside edge 21 of the bushing 17, as shown in FIG. 6.

Figure 9:
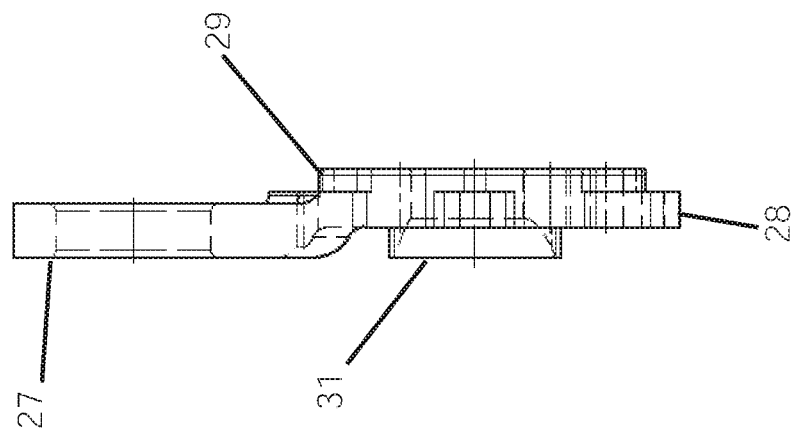
FIG. 9 is a side elevation of the shaft location tool of FIG. 7.
Figure 8:
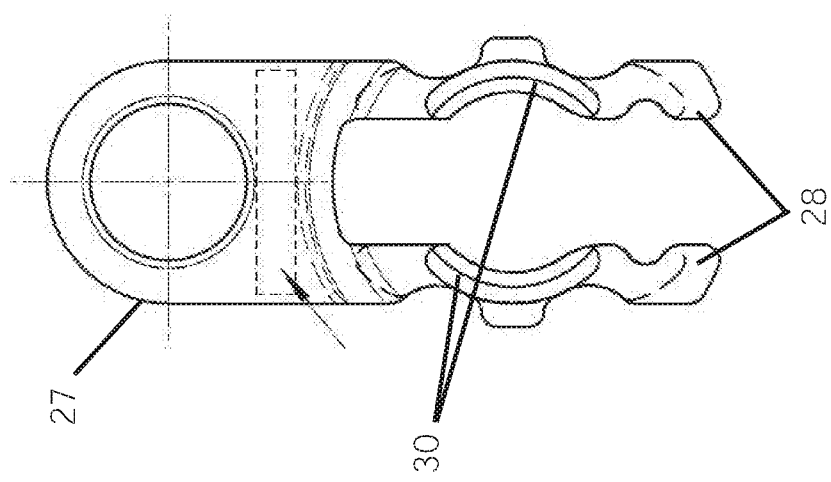
FIG. 8 is a rear elevation of the shaft location tool of FIG. 7.
Figure 7:
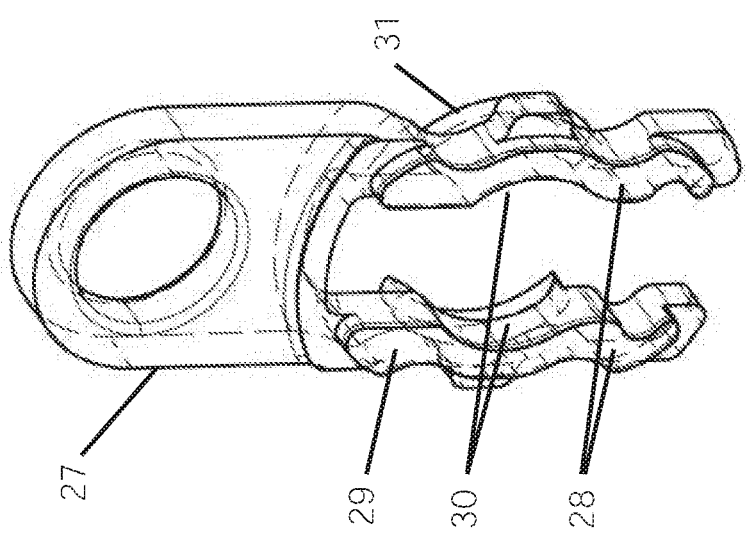
FIG. 7 is a front perspective view of another embodiment of a shaft location tool.

FIGS. 7 to 9 show an alternative shaft location tool, and FIG. 10 shows that tool in use. Similar to the assembly tool shown in FIG. 5 this tool also comprises a pair of assembly clips 27. As the clips are identical, only one is illustrated in FIGS. 7 to 9. Similar to the assembly tool shown in FIG. 5 the clip comprises a body with a pair of shaft receiving claws 28 defining an open ended U-shaped slot. The claws support an aperture engagement portion 29 sized and shaped to mate with the sides of the aperture 19 in the bushing 17. The inside edges of the opposed claws 28 comprise opposed concave surfaces 30 which are extended by protrusions 31 which extend from the opposite side of the clip to the engagement portion. The opposed concave surfaces are shaped to conform to the outside surface of the sleeve 11. To the opposite end of the clip to the open end of the open ended slot formed by the claws 28 the body of the clip forms a ring, defining a generally circular opening. The clip is formed from a resiliently flexible material. It may, for example, be moulded from a resiliently flexible plastics material.

The assembly tool is used in a similar fashion to that shown in FIG. 5, as best understood from FIG. 10. When the sleeve 11 is introduced between the claws 28 of the clips it is received between the two opposed concave surfaces of, and gripped by, the claws which holds the sleeve in the necessary central position within the bushing 17. Then, when all the fixtures are tight the two clips are withdrawn by pulling them off the sleeve. When the clips are fitted the rings of each clip project above the part of the second strut member 6 defining the opening 16, enabling a user easily pull the clips from the assembly, for example by inserting a digit through the rings defined by the clips.

Figure 13:
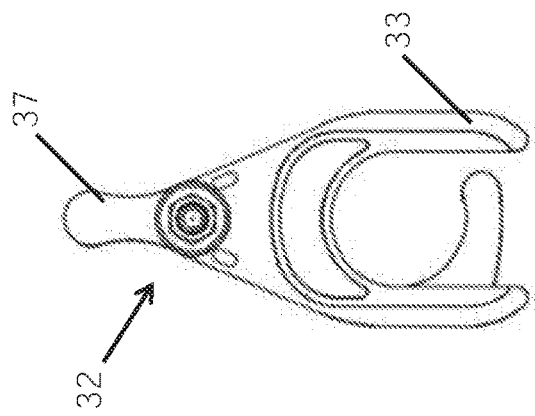
FIG. 13 is a rear elevation of the tool of FIG. 11.
Figure 12:
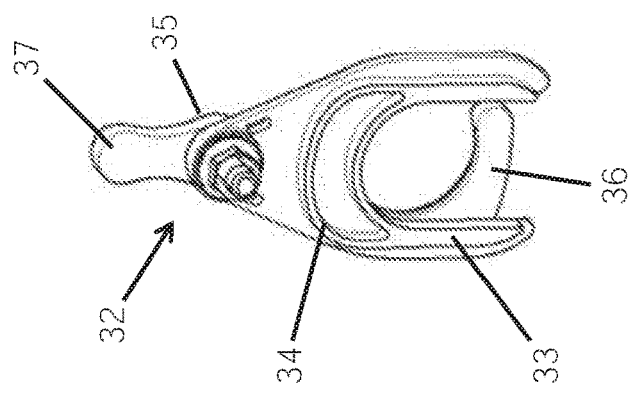
FIG. 12 is a rear perspective view of the tool of FIG. 11.
Figure 11:
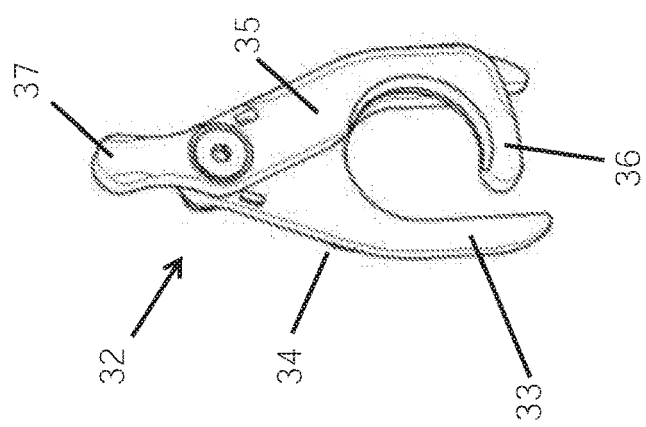
FIG. 11 is a front perspective view of another embodiment of a shaft location tool.
Figure 14:
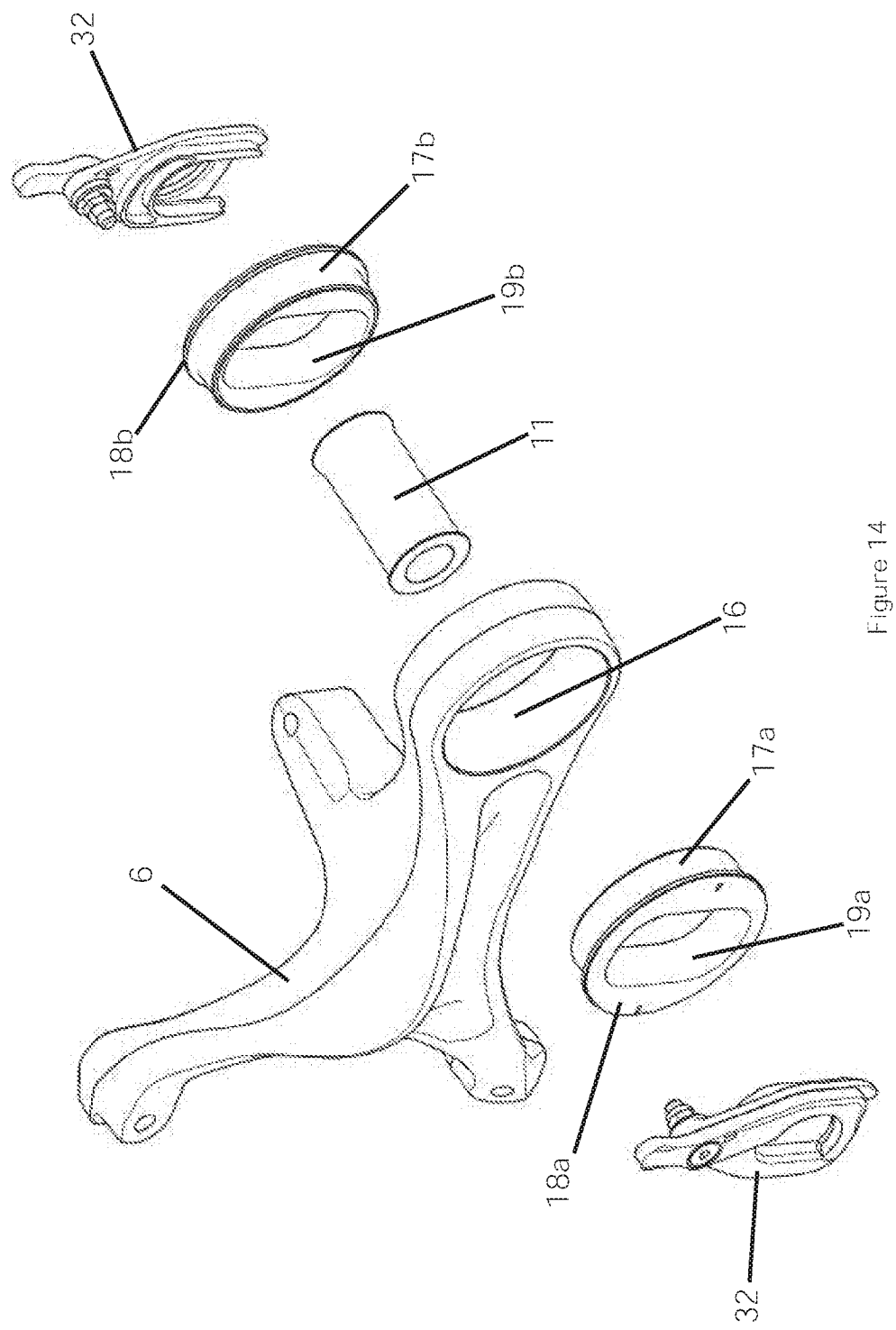
FIG. 14 is a view corresponding to FIG. 5, but showing the shaft location tool of FIGS. 7 to 9.

FIGS. 11 to 13 show yet another embodiment of a shaft location tool, and FIG. 14 shows that tool in use. Again this tool comprises a pair of assembly clips 32, only one of which is illustrated in FIGS. 11 to 13. Each clip comprises two pivotally connected parts. The first part 33 comprises a pair of shaft receiving claws which define an open ended U-shaped slot. As with the other clips described, the claws support an aperture engagement portion 34 sized and shaped to mate with the sides of the aperture 19 in the bushing 17. The inside edges of the opposed claws are substantially flat. At the opposite end of the clip to the open end of the open ended slot formed by the claws, the first part 33 of the clip is pivotally connected to the second part 35 of the clip. The second part comprises an arm 36 with a generally arcuate inside surface, and takes the general form of a hook. The first 33 and second 35 parts of the clip may be pivoted relative to one another between an open position, where the second part is away from the open ended slot of the first part and a closed position, as shown in the drawings, where the arm 36 of the second part extends between the two claws defining the open ended slot. The second part 33 extends beyond the pivotal connection with the first part forming a graspable tab 37. Both parts of the clip are substantially rigid and may, for example, be moulded from a generally rigid plastic material, or machined from a metal, such as aluminium.

In use, as best seen in FIG. 14, clips are introduced into the aperture 19 in the bushing 17. The sleeve is introduced into the open ended slot defined by the first part 33 of the clip and, if it is not already in the closed state, the second part 35 of the clip is pivoted to bring the clip into the closed state so that the arm 36 of the second part retains the sleeve 11 in the open ended slot of the first part 33.

Then, when all the fixtures are tight the two clips are put into their open state by pivoting the second part 35 relative to the first part 33, using the tab 37. The clips can then be withdrawn over the sleeve 11, by grasping the tab 37, or otherwise.

The above embodiments are described by way of example only. Many variations are possible without departing from the scope of the invention as defined in the appended claims.

The invention claimed is:

1. A handling strut for a vehicle, the handling strut formed of at least two strut members; a first strut member for connection to a powertrain and a second strut member for connection to a structural member of the vehicle; wherein one of said strut members comprises a bushing and the other strut member comprises a shaft arranged to extend through an aperture in the bushing; wherein the aperture through the bushing is wider than the shaft, a predetermined air gap is provided between the shaft and the bushing, and the first strut member is decoupled from the second strut member.

2. A handling strut according to claim 1 wherein the shape of the aperture in the bushing is elongate.

3. A handling strut according to claim 2 wherein the aperture is substantially rectangular or ovular.

4. A handling strut according to claim 2 wherein the bushing is arranged such that the elongate axis is substantially vertical.

5. A handling strut according to claim 1 wherein the air gap laterally of the shaft is between 3 and 15 mm and/or wherein the air gap in the vertical direction is between 10 and 50 mm in total above and below the shaft.

6. A handling strut according to claim 1 wherein the air gap laterally of the shaft is smaller than the air gap in the vertical direction.

7. A handling strut according to claim 1 wherein the bushing is resilient, formed of an elastomeric material.

8. A handling strut according to claim 1 wherein the shaft comprises a sleeve and wherein a fastener extends through the sleeve to connect the shaft to the respective strut member.

9. A handling strut according to claim 8 wherein the first strut member comprises the sleeve and the second strut member comprises the bushing.

10. A handling strut according to claim 1 wherein the first strut member comprises an engine bracket, having fixtures arranged for fixing to an engine, the fixtures comprising feet provided with apertures corresponding to threaded apertures in the powertrain.

11. A handling strut according to claim 1 wherein the second strut member comprises fixtures for connection to the structural member, the fixtures comprising projections provided with apertures corresponding to threaded apertures in the structural member.

12. A handling strut according to claim 1 wherein the first or second strut member includes a clevis arranged to receive the other strut member, the other strut member including the bushing and the clevis arranged to be connected to the shaft, wherein the clevis is provided with opposing perforations through which a bolt extends, to hold a sleeve in place.

13. A vehicle comprising a powertrain and structural members, the powertrain being connected to at least one structural member by mounts and connected to another structural member by a handling strut according to claim 1.

14. A vehicle according to claim 13 which is a rear wheel drive, or four wheel drive automobile.

15. A method of installing a handling strut in an automobile, the method comprising connecting a first strut member to a powertrain and connecting a second strut member to a structural member of the vehicle; wherein one of said strut members comprises a bushing and the other strut member comprises a shaft arranged to extend through an aperture in the bushing; wherein the aperture through the bushing is wider than the shaft, a predetermined air gap is provided between the shaft and the bushing, and the first strut member is decoupled from the second strut member.

16. A method according to claim 15 further comprising clipping the shaft into a shaft location tool and arranging the shaft location tool in the aperture of the bushing, so as to locate the shaft in a predetermined position; rigidly fixing the strut members to the powertrain and the structural member of the vehicle respectively and rigidly fixing the shaft in position, then removing the shaft location tool, so as to provide a predetermined air gap between the shaft and the bushing.

* * * * *